(12) United States Patent
Kwon (10) Patent No.: US 11,145,303 B2
(45) Date of Patent: Oct. 12, 2021

(54) ELECTRONIC DEVICE FOR SPEECH RECOGNITION AND CONTROL METHOD THEREOF

(71) Applicant: SAMSUNG ELECTRONICS CO., LTD., Suwon-si (KR)

(72) Inventor: Jaesung Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 16/295,061

(22) Filed: Mar. 7, 2019

(65) Prior Publication Data

US 2019/0304450 A1 Oct. 3, 2019

(30) Foreign Application Priority Data

Mar. 29, 2018 (KR) ........................ 10-2018-0036850

(51) Int. Cl.
*G10L 15/22* (2006.01)
*G10L 15/183* (2013.01)
*G10L 15/26* (2006.01)

(52) U.S. Cl.
CPC ............ *G10L 15/22* (2013.01); *G10L 15/183* (2013.01); *G10L 15/26* (2013.01); *G10L 2015/228* (2013.01)

(58) Field of Classification Search
CPC ..................................................... G10L 15/22
See application file for complete search history.

(56) References Cited

U.S. PATENT DOCUMENTS

| 9,786,296 B2 | 10/2017 | Kim et al. |
| 9,812,126 B2 | 11/2017 | Khan et al. |
| 9,865,252 B2 | 1/2018 | Bak et al. |

(Continued)

FOREIGN PATENT DOCUMENTS

| JP | 5042799 | 10/2012 |
| KR | 10-2014-0098525 | 8/2014 |

(Continued)

OTHER PUBLICATIONS

International Search Report and Written Opinion dated Jun. 14, 2019, issued in International Application No. PCT/KR2019/002672.

*Primary Examiner* — Jialong He
(74) *Attorney, Agent, or Firm* — Nixon & Vanderhye P.C.

(57) ABSTRACT

An electronic device and a control method thereof are provided. The electronic device includes: a speech input interface comprising speech input circuitry; a communicator comprising communication circuitry; a storage configured to store at least one keyword for each of a plurality of domains; and a processor configured to control the electronic device to: obtain keywords from a user's speech input through the speech input interface, identify a domain related to the obtained keywords based on a comparison between the obtained keywords and the keywords stored in the storage, and control the electronic device to perform speech recognition for the user's speech through an engine based on the identified domain. At least portions of the storage and a learning method of an engine may include artificial intelligence algorithms, and may be performed according to at least one of machine learning, a neural network, and/or a deep learning algorithm.

18 Claims, 7 Drawing Sheets

(56) References Cited

U.S. PATENT DOCUMENTS

| | | | | |
|---|---|---|---|---|
| 10,446,147 | B1* | 10/2019 | Moniz | G10L 15/22 |
| 2010/0312547 | A1* | 12/2010 | Van Os | G06F 3/167 |
| | | | | 704/9 |
| 2011/0144999 | A1* | 6/2011 | Jang | G06K 9/00892 |
| | | | | 704/270.1 |
| 2014/0006022 | A1* | 1/2014 | Yoon | G10L 15/30 |
| | | | | 704/235 |
| 2014/0214425 | A1 | 7/2014 | Bak et al. | |
| 2014/0278427 | A1 | 9/2014 | Riviere Escobedo et al. | |
| 2015/0025890 | A1 | 1/2015 | Jagatheesan et al. | |
| 2015/0134336 | A1 | 5/2015 | Huang et al. | |
| 2015/0243281 | A1* | 8/2015 | Song | G10L 15/08 |
| | | | | 704/251 |
| 2015/0310855 | A1* | 10/2015 | Bak | G10L 15/22 |
| | | | | 704/249 |
| 2016/0379633 | A1* | 12/2016 | Lehman | G10L 15/22 |
| | | | | 704/275 |
| 2017/0004828 | A1* | 1/2017 | Lee | G10L 15/25 |
| 2017/0076724 | A1 | 3/2017 | Park et al. | |
| 2018/0067717 | A1 | 3/2018 | Limaye et al. | |
| 2019/0163785 | A1* | 5/2019 | Ramachandra Iyer | |
| | | | | G06F 16/3334 |

FOREIGN PATENT DOCUMENTS

| | | |
|---|---|---|
| KR | 10-2016-0028468 | 3/2016 |
| KR | 10-2016-0030199 | 3/2016 |
| KR | 10-2017-0088982 | 8/2017 |
| KR | 10-1834564 | 3/2018 |

* cited by examiner

| 133-1 | 133-2 | 133-3 | 133-4 |
| --- | --- | --- | --- |
| SMARTPHONE DOMAIN | TV DOMAIN | WASHING MACHINE DOMAIN | CLEANER DOMAIN |
| SMARTPHONE<br>PHONE<br>PHONE CALL<br>TEXT MESSAGE<br>NUMBER<br>PHOTOGRAPH<br>MUSIC<br>SONG<br>PLAY<br>SEARCH<br>STOP<br>YouTube<br>VOLUME<br>INTERNET<br>⋮ | TV<br>TELEVISION<br>CHANNEL<br>DRAMA<br>ENTERTAINMENT<br>MOVIE<br>VOLUME<br>PLAY<br>STOP<br>SEARCH<br>INTERNET<br>YouTube<br>⋮ | WASHING MACHINE<br>WASHING<br>DRYING<br>LAUNDRY<br>RINSING<br>DEWATERING<br>⋮ | CLEANER<br>CLEANING<br>WIPING<br>FLOOR<br>ROOM<br>LIVING ROOM<br>⋮ |

FIG. 5A

1) "SEARCH FOR AND PLAY POPULAR DRAMA WITH SMARTPHONE"
2) "SEARCH FOR ACTION MOVIE WITH SMARTPHONE"

| 133-1 → SMARTPHONE DOMAIN | | TV DOMAIN ← 133-2 | |
|---|---|---|---|
| KEYWORD | PRIORITY | KEYWORD | PRIORITY |
| SMARTPHONE | 5 | TV | 5 |
| ⋮ | ⋮ | ACTION | 1 |
|  |  | MOVIE | 1 |
|  |  | DRAMA | 3 |
|  |  | ⋮ | ⋮ |
| SEARCH | 3 | SEARCH | 2 |
| PLAY | 2 | PLAY | 2 |
| ⋮ | ⋮ | ⋮ | ⋮ |

FIG. 5B

"PLAY POPULAR VIDEO ON YouTube"

| 133-1 → SMARTPHONE DOMAIN | TV DOMAIN ← 133-2 |
|---|---|
| SMARTPHONE | TV |
| ⋮ | ⋮ |
| YouTube | YouTube |
| ⋮ | ⋮ |
| SEARCH | SEARCH |
| PLAY | PLAY |
| ⋮ | ⋮ |

ELECTRONIC DEVICE FOR SPEECH RECOGNITION AND CONTROL METHOD THEREOF

CROSS-REFERENCE TO RELATED APPLICATION

This application is based on and claims priority under 35 U.S.C. § 119 to Korean Patent Application No. 10-2018-0036850, filed on Mar. 29, 2018, in the Korean Intellectual Property Office, the disclosure of which is incorporated by reference herein in its entirety.

BACKGROUND

Field

The disclosure relates to an electronic device and a control method thereof, and, for example, to an electronic device receiving a user's speech, and a control method thereof.

Description of Related Art

A speech recognition technology refers to a technique in which a device recognizes a person's speech and identifies a content of the linguistic meaning from the recognized person's speech. Recently, in accordance with the development of the speech recognition technology, the speech recognition technology has been improved to an available level in an environment in which only an individual device is used.

Meanwhile, recently, in accordance with the development of an electronic technology, the Internet of Things (IoT) in which electronic devices around a user form a network to exchange information from each other has become possible. Therefore, an attempt to apply the speech recognition technology to the IoT environment has increased. However, a speech recognition engine specialized for an individual device has a difficulty in recognizing utterance of a user for executing functions of heterogeneous devices.

Therefore, a device-independent speech recognition model (general model) executing speech recognition on the heterogeneous devices has been developed. The device-independent speech recognition model may support utterance of the user for executing functions of various devices, but deterioration of performance of the device-independent speech recognition model in an individual device may occur.

SUMMARY

Example embodiments of the disclosure address the above disadvantages and other disadvantages not described above.

The disclosure provides an electronic device that obtains a keyword included in a user's speech, identifies a domain corresponding to the obtained keyword, and allows speech recognition for the user's speech to be performed through a speech recognition engine based on the identified domain, and a control method thereof.

According to an example embodiment of the disclosure, an electronic device includes: a speech input interface comprising speech input circuitry; a communicator comprising communication circuitry; a storage configured to store at least one keyword for each of a plurality of domains; and a processor configured to control the electronic device to: obtain keywords from a user's speech input through the speech input interface, identify a domain related to the obtained keywords based on a comparison between the obtained keywords and the keywords stored in the storage, and perform speech recognition for the user's speech through an engine based on the identified domain.

The processor may obtain words matched to the at least one keyword for each of the plurality of domains as the keywords from the user's speech.

The processor may identify that a domain in which the number of keywords matched to the obtained keywords is the largest among the plurality of domains is the domain related to the obtained keywords.

The processor may identify the domain related to the obtained keywords based on at least one of a level in which keywords matched to the obtained keywords are present and priorities set for each domain.

Based on the number of domains in which the numbers of keywords matched to the obtained keywords being the largest among the plurality of domains is plural, the processor may identify that a domain having the highest priority is the domain related to the obtained keywords depending on priorities set for the plurality of domains in which the numbers of matched keywords are the largest.

The priorities may be determined based on an electronic device to which the user's speech is input.

The processor may perform the speech recognition for the user's speech using an engine of the electronic device based on the identified domain when the identified domain corresponds to the electronic device, and transmit the user's speech to an engine of an external device based on the identified domain through the communicator when the identified domain corresponds to the external device.

The processor may perform the speech recognition using an engine based on a domain corresponding to the electronic device when the user's speech is input, and identify whether to use a result of the performed speech recognition based on whether the identified domain and the domain corresponding to the electronic device coincide with each other.

The processor may use the result of the performed speech recognition based on the identified domain and the domain corresponding to the electronic device coinciding with each other, and transmit the user's speech to an engine of an external device corresponding to the identified domain through the communicator based on the identified domain and the domain corresponding to the electronic device not coinciding with each other.

The external device may perform the speech recognition using an engine of a specific domain of the plurality of domains.

According to another example embodiment of the disclosure, a control method of an electronic device includes: obtaining keywords from a user's speech input to the electronic device through a speech input interface; comparing the obtained keywords and keywords stored in the electronic device; identifying a domain related to the obtained keywords based on a comparison between the obtained keywords and the keywords stored in the electronic device; and performing speech recognition for the user's speech through an engine based on the identified domain.

In the obtaining of the keywords, words matched to at least one keyword for each of a plurality of domains may be obtained as the keywords from the user's speech.

In the identifying of the domain, it may be identified that a domain in which the number of keywords matched to the obtained keywords is the largest among the plurality of domains is the domain related to the obtained keywords.

In the identifying of the domain, the domain related to the obtained keywords may be identified based on at least one of a level in which keywords matched to the obtained keywords are present and priorities set for each domain.

In the identifying of the domain, based on the number of domains in which the numbers of keywords matched to the obtained keywords being the largest among the plurality of domains is plural, it may be identified that a domain having the highest priority is the domain related to the obtained keywords depending on priorities set for the plurality of domains in which the numbers of matched keywords are the largest.

The priorities may be determined based on an electronic device to which the user's speech is input.

In the controlling the electronic device to perform the speech recognition for the user's speech, the speech recognition for the user's speech may be performed using an engine of the electronic device based on the identified domain when the identified domain corresponds to the electronic device, and the user's speech may be transmitted to an engine of an external device through a communicator based on the identified domain corresponding to the external device.

The controlling the electronic device to perform the speech recognition for the user's speech may include: performing the speech recognition using an engine based on a domain corresponding to the electronic device when the user's speech is input; and identifying whether to use a result of the performed speech recognition based on whether the identified domain and the domain corresponding to the electronic device coincide with each other.

The controlling the electronic device to perform the speech recognition for the user's speech may further include using the result of the performed speech recognition based on the identified domain and the domain corresponding to the electronic device coinciding with each other, and transmitting the user's speech to an engine of an external device corresponding to the identified domain through a communicator based on the identified domain and the domain corresponding to the electronic device not coinciding with each other.

The external device may perform the speech recognition using an engine of a specific domain of the plurality of domains.

As set forth above, according to the various example embodiments of the disclosure, the electronic device enables speech recognition of heterogeneous devices in spite of using a speech recognition engine specialized for an individual electronic device by performing learning with individual domain data. Therefore, convenience of a user that uses a speech recognition electronic device in the Internet of things (IoT) environment is increased.

BRIEF DESCRIPTION OF THE DRAWINGS

The above and/or other aspects, features and advantages of various example embodiments of the present disclosure will be more apparent from the following detailed description, taken in conjunction with the accompanying drawings, in which.

DETAILED DESCRIPTION

General terms that are currently widely used may be terms used in the disclosure in consideration of features of various example embodiments of the disclosure, but may be changed depending on the intention of those skilled in the art or a judicial precedent, the emergence of a new technique, and the like. In addition, terms may be arbitrarily selected. In this case, the meaning of such terms will be provided by way of example in a corresponding description portion of the disclosure. Therefore, the terms used in the disclosure should be defined based on the meaning of the terms, the contents throughout the disclosure, and common sense rather than simple names of the terms.

In addition, throughout the accompanying drawings of the disclosure, the same reference numerals may denote parts or components performing substantially the same functions. For convenience of explanation and understanding, different example embodiments may be described using the same reference numerals. Even though the components having the same reference numerals are illustrated in a plurality of drawings, the plurality of drawings do not limit the disclosure to a single embodiment.

In the disclosure, terms such as first, second, and the like, may be used to refer to various components. These terms are not used to limit an order, characteristics, the number, and the like, of components, and are used simply for the purpose of distinguishing components from each other.

Terms used in the disclosure are used to describe specific embodiments rather than limiting the scope of the disclosure. Singular forms are intended to include plural forms unless the context clearly indicates otherwise. Throughout the disclosure, unless described to the contrary, "including" any component will be understood to imply the inclusion of other components rather than the exclusion of other components.

In addition, terms "-er/or", "module", and the like, described in the disclosure may refer, for example, to a processing unit of at least one function or operation and may be implemented by hardware or software or any combination of hardware and software. In addition, a plurality of '~ers/~ors' or a plurality of 'modules' may be integrated in at least one module and be implemented by at least one processor (not illustrated) except for a '~er/or' or a 'module' that needs to be implemented by specific hardware.

In addition, in the disclosure, a case in which any portion is referred to as being "connected to" another portion not only includes a case in which any one portion and another portion are "directly connected to" each other, but also includes a case in which any one portion and another portion are "indirectly connected to" each other through the other medium.

Hereinafter, various example embodiments of the disclosure will be described in greater detail with reference to the accompanying drawings. However, the disclosure may be implemented in various different forms, and is not limited to example embodiments described herein. In addition, in the drawings, portions unrelated to the description may be omitted, and similar reference numerals will be used to describe similar portions throughout the disclosure.

Hereinafter, various example embodiments of the disclosure will be described in greater detail.

Figure 1:
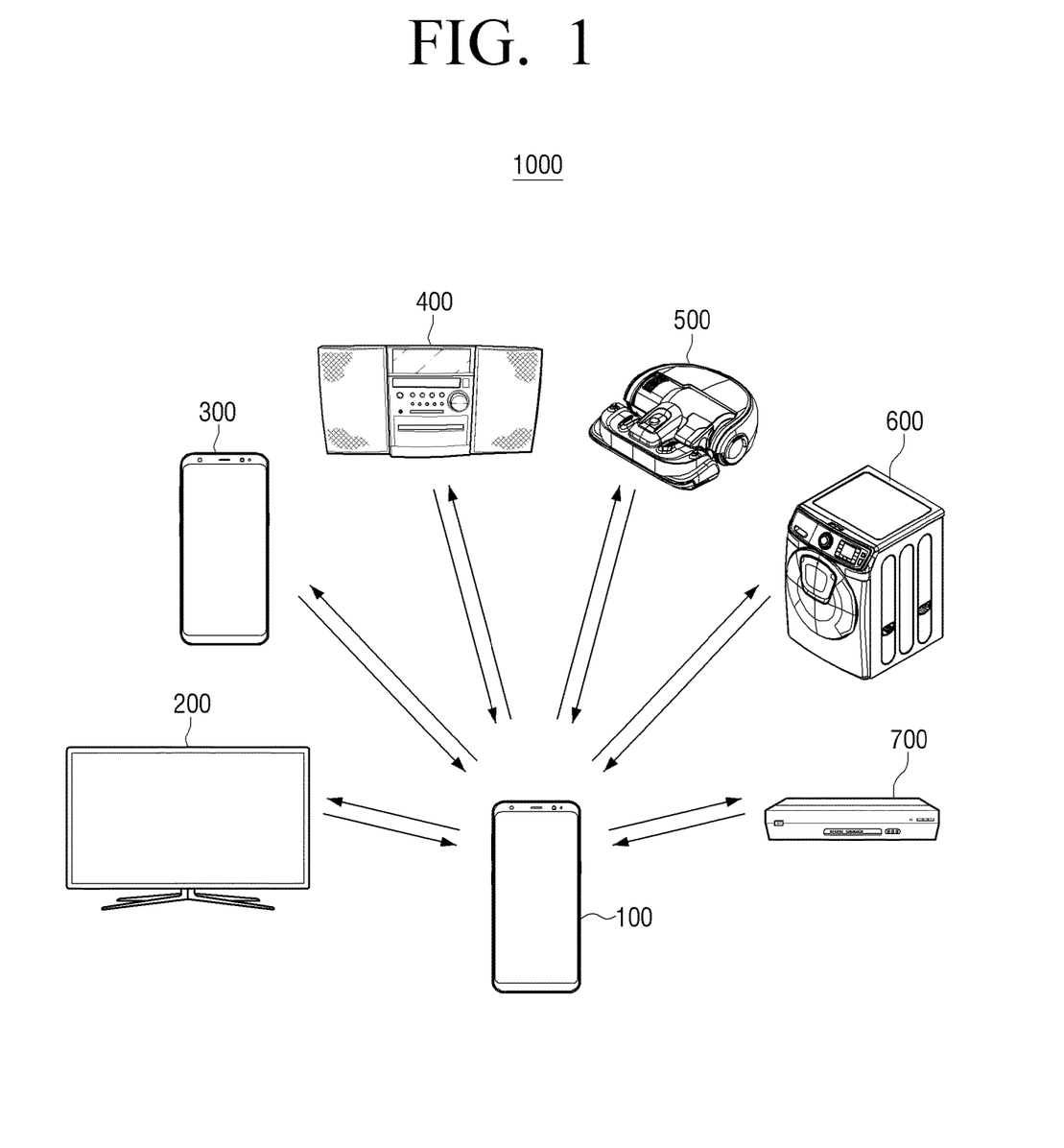
FIG. 1 is a diagram illustrating an example electronic device system according to an embodiment of the disclosure.

FIG. 1 is a diagram illustrating an example electronic device system according to an embodiment of the disclosure.

Referring to FIG. 1, an electronic device system 1000 includes an electronic device 100 and one or more external electronic devices 200, 300, 400, 500, 600 and 700.

The electronic devices 100, 200, 300, 400, 500, 600 and 700 may communicate with and be connected to each other through a network.

For example, the electronic device 100 and one or more external electronic devices 200, 300, 400, 500, 600 and 700 may perform communication in a device-to-device (D2D) communication manner using various communication networks. Furthermore, the electronic device 100 and one or more external electronic devices 200, 300, 400, 500, 600 and 700 may perform communication through a server (not illustrated). In this case, the electronic device 100 and one or more external electronic devices 200, 300, 400, 500, 600 and 700 may perform communication with the server (not illustrated) through a gateway (not illustrated).

Therefore, the electronic devices 100, 200, 300, 400, 500, 600 and 700 may transmit and receive various data to and from each other.

The electronic devices 100, 200, 300, 400, 500, 600 and 700 may perform speech recognition.

For example, the electronic devices 100, 200, 300, 400, 500, 600 and 700 may receive a speech uttered by a user, and perform speech recognition on the user's speech through speech recognition engines stored in the electronic devices 100, 200, 300, 400, 500, 600 and 700.

The speech recognition engine may include an automatic speech recognition (ASR) engine for converting the user's speech into a text and a natural language understanding (NLU) engine for extracting the meaning of the user utterance from a recognition result of the ASR engine. In this case, the ASR engine and the NLU engine may include various processing circuitry and/or executable program elements and process speech signals using a speech recognition model and a language understanding model, respectively.

As described above, the electronic devices 100, 200, 300, 400, 500, 600 and 700 may perform the speech recognition by themselves using speech processing engines.

In this case, the electronic devices 100, 200, 300, 400, 500, 600 and 700 may perform the speech recognition through speech recognition engines based on domains corresponding to the electronic devices 100, 200, 300, 400, 500, 600 and 700, respectively.

For example, when the electronic device 100 is implemented as a smartphone, the electronic device 100 may have a domain related to various services that may be provided by the smartphone, such as dialing, answering the phone, the Internet search, and the like, and when the external electronic device 200 is implemented as a television (TV), the external electronic device 200 may have a domain related to various services that may be provided by the TV, such as providing broadcast channel information, searching for broadcast contents, and the like.

As described above, the electronic devices 100, 200, 300, 400, 500, 600 and 700 may perform the speech recognition through speech recognition engines based on domains specialized for services supported by the electronic devices 100, 200, 300, 400, 500, 600 and 700, respectively. To this end, the electronic devices 100, 200, 300, 400, 500, 600 and 700 may include a database in which various data required for a speech recognition operation are stored, and data such as, for example, and without limitation, a corpus, language dictionary, and the like, that may be referred to during the speech recognition operation may be stored in the database.

Although it has been described in the abovementioned embodiment that the electronic devices 100, 200, 300, 400, 500, 600 and 700 perform the speech recognition by themselves, this is only an example, and the electronic devices 100, 200, 300, 400, 5000, 600 and 700 may also perform the speech recognition through speech recognition servers (not illustrated) connected to the electronic devices 100, 200, 300, 400, 500, 600 and 700.

The speech recognition engines may be provided in the speech recognition servers (not illustrated).

For example, when the speech uttered by the user is received, the electronic devices 100, 200, 300, 400, 500, 600 and 700 may transmit the received speech to the speech recognition servers (not illustrated) and receive speech recognition results from the speech recognition servers (not illustrated).

In this example, the speech recognition server (not illustrated) may be separately provided in each of the electronic devices 100, 200, 300, 400, 500, 600 and 700, and each speech recognition server (not illustrated) may perform the speech recognition on the speech received from each electronic device using the speech recognition engine based on the domain corresponding to each electronic device.

The electronic devices 100, 200, 300, 400, 500, 600 and 700 may also use a single common speech recognition server (not illustrated). In this example, the speech recognition server (not illustrated) may include speech recognition engines based on domains corresponding to each of the electronic devices, and when the user's speech is received from the electronic device 100, the speech recognition server (not illustrated) may perform the speech recognition using a speech recognition engine based on a domain corresponding to the electronic device transmitting the user's speech.

As described above, according to an example embodiment of the disclosure, the speech recognition may be performed based on the domain specialized for each of the electronic devices.

When the user wants to use functions of the electronic device and the external electronic devices 100, 200, 300, 400, 500, 600 and 700 while using one electronic device 100, the user may input the functions of the electronic device 100, 200, 300, 400, 500, 600 and 700 that he/she wants to use in the electronic device 100 using speech.

For example, the electronic device 100 may receive the user's speech for controlling the electronic devices 100, 200, 300, 400, 500, 600 and 700. In this example, the electronic device 100 may identify the domain corresponding to the electronic devices 100, 200, 300, 400, 500, 600 and 700 that the user wants to control and transfer a user's speech signal to a speech recognition engine based on the corresponding domain so that the electronic devices 100, 200, 300, 400, 500, 600 and 700 that the user wants to control may recognize the user's speech.

To this end, the electronic device may include, for example, a keyword spotting (KWS) engine.

The keyword spotting engine, which may, for example, be one form of a speech recognition engine, may, for example, and without limitation, recognize the user's speech and detect a keyword from the user's speech.

In this example, the keyword may refer, for example, to a word specialized for a specific domain to identify a domain corresponding to the electronic device. For example, in case of a TV domain, the keyword may, for example, and without limitation, be a broadcasting, an image, a channel, a volume, or the like, provided by the TV, and in case of a smartphone domain, the keyword may, for example, and without limitation, be a phone call, a text message, a number, or the like, related to a service provided by the smartphone.

The keyword spotting engine may, for example, and without limitation, convert the received user's speech signal into a text and spot the keyword from the converted text.

When the electronic device 100 detects the keyword included in the speech uttered by the user, the electronic device 100 may identify a domain corresponding to the user's speech using the detected keyword, and transmit a user's speech signal to a speech recognition engine based on the identified domain of the electronic devices 100, 200, 300, 400, 500, 600 and 700.

The domain corresponding to the user's speech may refer, for example, to a domain of the electronic devices 100, 200, 300, 400, 500, 600 and 700 finally receiving the user's speech input to the electronic device 100, recognizing the user's speech, and performing a function depending on the user's speech.

For example, when the user utters "Let a robot cleaner clean a living room" to the smartphone, a domain of the robot cleaner 500 may be the domain corresponding to the user's speech in that a user's speech signal is transferred to the robot cleaner 500 though the smartphone, a speech recognition engine of the robot cleaner 500 recognizes the user's speech, and the robot cleaner 500 performs a living room cleaning function depending on the user's speech.

As described above, the domain corresponding to the user's speech recognizes the user's speech, such that a recognition rate for the user's speech may be increased and the user may easily control a device that he/she wants to control.

An example in which the electronic device 100 receiving the user's speech is the smartphone is illustrated in FIG. 1, but the electronic device 100 receiving the user's speech is not necessarily limited thereto. For example, a set-top box that does not include a display and includes only a simple light emitting diode (LED) display, an electronic device that includes a display to provide an image, or the like, may be the electronic device receiving the user's speech as illustrated in FIG. 1.

A remote control device for controlling the external electronic devices 200, 300, 400, 500, 600 and 700, such as a remote controller, or the like, may be the electronic device 100 receiving the user's speech as illustrated in FIG. 1. In this example, the remote control device may receive a speech from the user, identify a domain corresponding to the user's speech, and transfer a user's speech signal to a speech recognition engine based on the identified domain of the electronic devices 200, 300, 400, 500, 600 and 700.

When the remote control device does not identify the domain corresponding to the user's speech, the remote control device may transfer the received user's speech to one of the external electronic devices 200, 300, 400, 500, 600 and 700. In this case, external electronic devices 200 to 700 receiving the user's speech from the remote control device among the external electronic devices 200, 300, 400, 500, 600 and 700 may identify a domain corresponding to the user's speech received from the remote control device, and transfer a user's speech signal to a speech recognition engine based on the identified domain of the external electronic devices 200, 300, 400, 500, 600 and 700.

The external electronic devices 200, 300, 400, 500, 600 and 700 may, for example, and without limitation, be a TV 200, a smartphone 300, an audio system 400, a robot cleaner 500, a washing machine 600, a set-top box 700, or the like.

The external electronic devices 200, 300, 400, 500, 600 and 700 may not only receive data including the user's speech from the electronic device 100, and but may also transmit data to the electronic device 100. For example, the external electronic devices 200, 300, 400, 500, 600 and 700 may transmit a feedback for the reception of the user's speech to the electronic device 100, and transmit results obtained by controlling the external electronic devices 200, 300, 400, 500, 600 and 700 depending on the user's speech to the electronic device 100. Meanwhile, this is only an example, and the external electronic devices 200, 300, 400, 500, 600 and 700 may transmit various data to the electronic device 100.

The external electronic devices 200, 300, 400, 500, 600 and 700 may also transmit the user's speech to the other external electronic devices 200, 300, 400, 500, 600 and 700.

For example, when the external electronic device is the set-top box that does not include the display, the set-top box 700 may transmit an image signal to an external display device (not illustrated), and the external display device (not illustrated) receiving the image signal from the set-top box 700 may display a content screen corresponding to the image signal. The set-top box 700 may, for example, include a wired interface such as, for example, and without limitation, a high definition multimedia interface (HDMI), a display port (DP), a thunderbolt, or the like, and/or a wireless interface such as, for example, and without limitation, a Bluetooth, or the like, for outputting a video or audio signal to the external display device (not illustrated).

An example in which the external electronic devices 200, 300, 400, 500, 600 and 700 are the TV 200, the smartphone 300, the audio system 400, the robot cleaner 500, the washing machine 600, and the set-top box 700 is illustrated in FIG. 1, but the external electronic devices 200, 300, 400, 500, 600 and 700 are not necessarily limited thereto, and may be various electronic devices that may be used by a user, such as, for example, and without limitation, a personal computer (PC), a laptop computer, a tablet PC, an air conditioner, a refrigerator, an over-the-top (OTT), and the like. The electronic device 100 according to the disclosure may not only receive the speech from the user and transfer the user's speech to the electronic devices 100, 200, 300, 400, 500, 600 and 700 corresponding to the user's speech, but may also directly control the electronic devices 100, 200, 300, 400, 500, 600 and 700.

For example, when the electronic device 100 is implemented by the smartphone and an application for controlling the external electronic devices 200, 300, 400, 500, 600 and 700 such as the TV, the washing machine, the robot cleaner, and the like, is installed in the smartphone, the smartphone may control the external electronic devices 200, 300, 400, 500, 600 and 700.

In this example, applications for controlling each of the external electronic devices 200, 300, 400, 500, 600 and 700 may be individually installed in the electronic devices 100 depending on the external electronic devices 200, 300, 400, 500, 600 and 700 and/or an integrated application for integrally controlling the external electronic devices 200, 300, 400, 500, 600 and 700 may be installed in the electronic device 100.

In this example, the electronic device 100 may receive the user's speech, recognize the user's speech, and transmit control signals, which are speech recognition results, to the external electronic devices 200, 300, 400, 500, 600 and 700.

Figure 2:
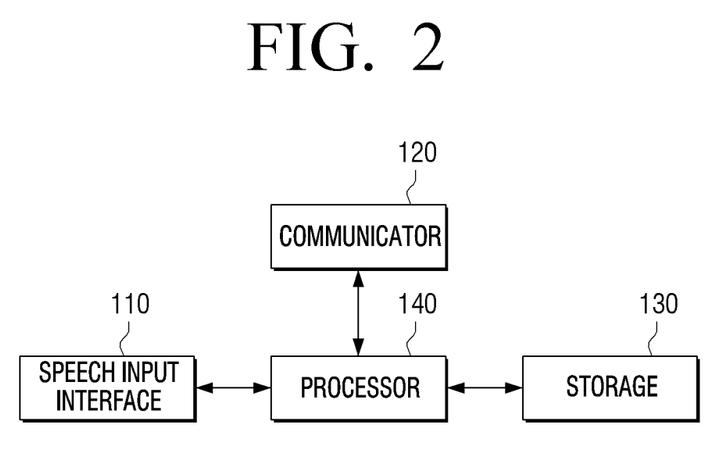
FIG. 2 is a block diagram illustrating an example configuration of an example electronic device according to an embodiment of the disclosure.

FIG. 2 is a block diagram illustrating example components of an example electronic device according to an embodiment of the disclosure.

As illustrated in FIG. 2, the electronic device 100 includes a speech input interface (e.g., including speech input circuitry) 110, a communicator (e.g., including communication circuitry) 120, a storage 130, and a processor (e.g., including processing circuitry) 140.

The speech input interface 110 may include various speech input circuitry and receives a speech uttered by the user.

The speech input interface 110 may include, for example, and without limitation, a microphone (not illustrated), or the like. In this example, the microphone (not illustrated) may be formed integrally with the speech input interface 110.

The speech input interface 110 may, for example, convert a user's speech received through the microphone (not illustrated) and having an analog form into a digital signal, and transmit a speech signal having a digital form to the processor 140.

The speech input interface 110 may further include various components and/or circuitry such as, for example, and without limitation, an amplification circuit (not illustrated) amplifying the user's speech received through the microphone (not illustrated) and having the analog form, an A/D conversion circuit (not illustrated) sampling the amplified user's speech to convert the amplified user's speech into a digital signal, a filter circuit (not illustrated) removing a noise component from the converted digital signal, and the like.

For example, the microphone (not illustrated) may receive an audio signal including the user's speech and having an analog form.

In addition, an ADC (not illustrated) may convert a multi-channel analog signal input from the microphone into a digital signal.

In addition, an energy determiner (not illustrated) may calculate energy of the converted digital signal and determine whether the energy of the digital signal is a predetermined value or more. When the energy of the digital signal is the predetermined value or more, the energy determiner (not illustrated) may transmit the input digital signal to a noise remover (not illustrated), and when the energy of the digital signal is less than the predetermined value, the energy determiner (not illustrated) may wait for another input without outputting the input digital signal to the outside. Therefore, the entire audio processing process is not activated by a sound other than the speech signal, such that unnecessary power consumption may be prevented and/or reduced.

When the digital signal is input to the noise remover (not illustrated), the noise remover (not illustrated) may remove a noise component from the digital signal including the noise component and a user's speech component. In this example, the noise component, which is a sudden noise that may occur in a home environment, may include, for example, an air conditioner sound, a cleaner sound, a music sound, and the like. In addition, the noise remover (not illustrated) may output the digital signal from which the noise component is removed to a speech signal generator (not illustrated).

The speech signal generator (not illustrated) may track an utterance position of the user present in a range of 360° with respect to the speech input (not illustrated) using a localization/speaker tracking module to obtain direction information on the user's speech. In addition, the speech signal generator (not illustrated) may extract a target sound source present in a range of 360° with respect to the speech input (not illustrated) using the digital signal from which the noise is removed and the direction information on the user's speech through a target spoken sound extraction module. In addition, the speech signal generator (not illustrated) may convert the user's speech into a user's speech signal having a form for transmission to the electronic device 100.

The communicator 120 may include various communication circuitry and perform communication with the external electronic devices 200, 300, 400, 500, 600 and 700. Therefore, the communicator 120 may transmit and receive various data to and from the external electronic devices 200, 300, 400, 500, 600 and 700.

When the speech recognition engine is implemented by a speech recognition server, the communicator 120 may perform communication with the speech recognition server (not illustrated). In this example, the communicator 120 may transmit the user's speech (for example, a speech signal having a digital signal form) received through the speech input interface 110 to the speech recognition server (not illustrated), and receive data on a speech recognition result from the speech recognition server (not illustrated).

The communicator 120 may include various communication modules including various communication circuitry such as, for example, and without limitation, a wired communication module (not illustrated), a short-range wireless communication module (not illustrated), a wireless communication module (not illustrated), and the like.

The wired communication module may, for example, be a module for performing communication with the external electronic devices 200, 300, 400, 500, 600 and 700 and the speech recognition server (not illustrated) according to a wired communication manner such as wired Ethernet. In addition, the short-range wireless communication module may, for example, be a module for performing communication with the external electronic devices 200, 300, 400, 500, 600 and 700 positioned in a short range according to a short-range wireless communication manner such as, for example, and without limitation, Bluetooth (BT), Bluetooth low energy (BLE), ZigBee manner, or the like. In addition, the wireless communication module may, for example, be a module connected to an external network according to a wireless communication protocol such as, for example, and without limitation, WiFi, IEEE, or the like, to perform communication with the external electronic devices 200, 300, 400, 500, 600 and 700 and the speech recognition server (not illustrated). In addition, the wireless communication module may further include a mobile communication module accessing a mobile communication network according to various mobile communication protocols such as, for example, and without limitation, $3^{rd}$ generation (3G), $3^{rd}$ generation partnership project (3GPP), long term evolution (LTE), LTE advanced (LTE-A), a 5th generation (5G) network, and the like, to perform communication.

The communicator 120 may perform communication with a remote control device, such as, a remote controller (not illustrated), for controlling the external electronic devices 200, 300, 400, 500, 600 and 700 as well as the external electronic devices 200, 300, 400, 500, 600 and 700.

For example, the communicator 120 may perform communication with the remote control device (not illustrated) according to the short-range communication manner such as, for example, and without limitation, the Bluetooth, the BLE, or the like, to transmit and receive various data.

Even in a case where the electronic device 100 is the remote control device such as the remote controller, or the like, unlike FIG. 1, the communicator 120 may transmit the user's speech to the external electronic devices 200, 300, 400, 500, 600 and 700 using the short-range wireless communication module and the wireless communication module such as, for example, and without limitation, the Bluetooth, the WiFi, and the like.

When the application for controlling the external electronic devices 200, 300, 400, 500, 600 and 700 is installed in the electronic device 100, the electronic device 100 may recognize the user's speech, and transfer control command signals to the external electronic devices 200, 300, 400, 500, 600 and 700 including domains corresponding to the user's speech.

In this example, the electronic device 100 may transfer the control command signals to the external electronic devices according to the communication manner such as the WiFi, the Bluetooth, and the like, and transfer the control command signals to the external electronic devices through infrared communication, or the like. To this end, the electronic device 100 may include a plurality of communicators.

In addition, when the electronic device 100 communicates with a server (not illustrated) and the external electronic devices 200, 300, 400, 500, 600 and 700, a communicator communicating with the server and a communicator communicating with the external electronic devices may be different from each other. For example, the electronic device 100 may perform the communication with the server (not illustrated) in a communication manner such as the Ethernet, the WiFi, or the like, and perform the communication with the external electronic devices 200, 300, 400, 500, 600 and 700 in a Bluetooth manner, an infrared communication manner, or the like.

The storage 130 may store various software and data for driving the electronic device 100.

For example, the storage 130 may store at least one keyword for each of a plurality of domains.

The keyword may refer, for example, to a word specialized for each domain corresponding to the electronic devices 100 to 700. For example, a word often used or likely to be used in a specific domain may be a keyword for the specific domain.

As described with reference to FIG. 1, the speech recognition may be performed using the specific domain for each of the electronic devices, and the electronic device 100 receiving the user's speech may determine a domain for the user's speech using keyword data stored in the storage 130. To this end, the storage 130 may store keyword data on the domains corresponding to the external electronic devices 200, 300, 400, 500, 600 and 700 as well as keyword data on the domain corresponding to the electronic device 100.

Therefore, even though the user inputs a speech command for functions that may be executed in the external electronic devices 200, 300, 400, 500, 600 and 700, the electronic device 100 may determine the domain for the user's speech using the keyword data stored in the storage 130.

However, this is only an example of the disclosure, and at least one keyword for each of the plurality of domains may also be stored in a separate server (not illustrated).

A speech recognition engine of the electronic device 100 may be stored in the storage 130. In this case, the speech recognition engine may include, for example, and without limitation, an ASR engine and/or an NLU engine.

The ASR engine, which is an engine recognizing a user's speech signal and converting the user's speech signal into text data, may include various processing circuitry and/or executable program elements and perform a speech-to-text (STT) function.

In addition, the NLU engine may include various processing circuitry and/or executable program elements and perform a function of converting informal language data included in the user's speech into formal language data that may be understood by a machine through morphological analysis, syntax analysis, and semantic analysis, and the like.

As described above with reference to FIG. 1, the speech recognition engine of the electronic device 100 may be included in the storage 130, but may be present in a separate device (not illustrated) such as a server. When the speech recognition engine of the electronic device 100 is present in the server (not illustrated), the electronic device 100 may transmit the user's speech to the speech recognition server through a wired/wireless interface, and receive a speech recognition result from the speech recognition server.

A keyword spotting engine may also be stored in the storage 130.

The keyword spotting engine may also be present in the separate device (not illustrated) such as the server, similar to the speech recognition engine. In this case, the keyword spotting engine may transmit a result obtained by spotting the keyword from the user's speech to the electronic device 100.

The storage 130 may be implemented by a non-volatile memory such as, for example, and without limitation, a flash memory, a hard disk drive (HDD), a solid state drive (SSD), or the like. However, a portion of the storage 130 may be implemented by a volatile memory such as, for example, and without limitation, a random access memory (RAM), or the like. For example, the storage 130 may store temporary stored data in a volatile memory region.

The processor 140 may include various processing circuitry and may control a general operation of the electronic device 100 and a signal flow between internal components of the electronic device 100 and processing data. For example, the processor 140 may control components of various hardware or software included in the electronic device 100, and perform various data processing and calculation. In addition, the processor 140 may load and process commands or data received from at least one of other components in a memory, and store various data in a non-volatile memory. To this end, the processor 140 may be implemented, for example, and without limitation, by a dedicated processor (for example, an embedded processor) for performing a corresponding operation, a generic-purpose processor (for example, a central processing unit (CPU) or an application processor) capable of performing corresponding operations by executing one or more software programs stored in a memory device, or the like.

In an example embodiment of the disclosure, the processor 140 may convert the user's speech input through the speech input interface 110 into a user's speech signal, and transfer the user's speech signal to the keyword spotting engine.

The keyword spotting engine receiving the user's speech signal may convert the user's speech signal into a text, and compare the text corresponding to the user's speech with keyword data for each domain stored in the storage 130 to obtain at least one keyword included in the speech.

The processor 140 may identify the domain for the user's speech from the keywords included in the user's speech, and transmit the user's speech signal to a speech recognition engine based on the identified domain.

The speech recognition engine receiving the user's speech signal may perform speech recognition on the user's speech signal, and transmit a speech recognition result to the electronic devices 100, 200, 300, 400, 500, 600 and 700 corresponding to the speech recognition engine.

In addition, the electronic devices 100, 200, 300, 400, 500, 600 and 700 may perform an operation depending on the speech recognition result. For example, when the user utters "Let a robot cleaner clean a living room" to the TV, a speech recognition engine based on a domain of the robot cleaner may recognize the user's speech signal, and the robot cleaner receiving a speech recognition result may clean the living room depending on the user's speech.

The electronic devices 100, 200, 300, 400, 500, 600 and 700 may also transmit a response signal indicating that they receive the user's speech signal to the electronic device 100 before they perform the operation depending on the speech recognition result described above.

Therefore, the electronic device 100 may inform the user of responses of the electronic devices 100, 200, 300, 400, 500, 600 and 700 receiving the user's speech signal in a visual or auditory information form. To this end, the electronic device 100 may include a display (not illustrated) or a speech output (not illustrated).

Figure 3:
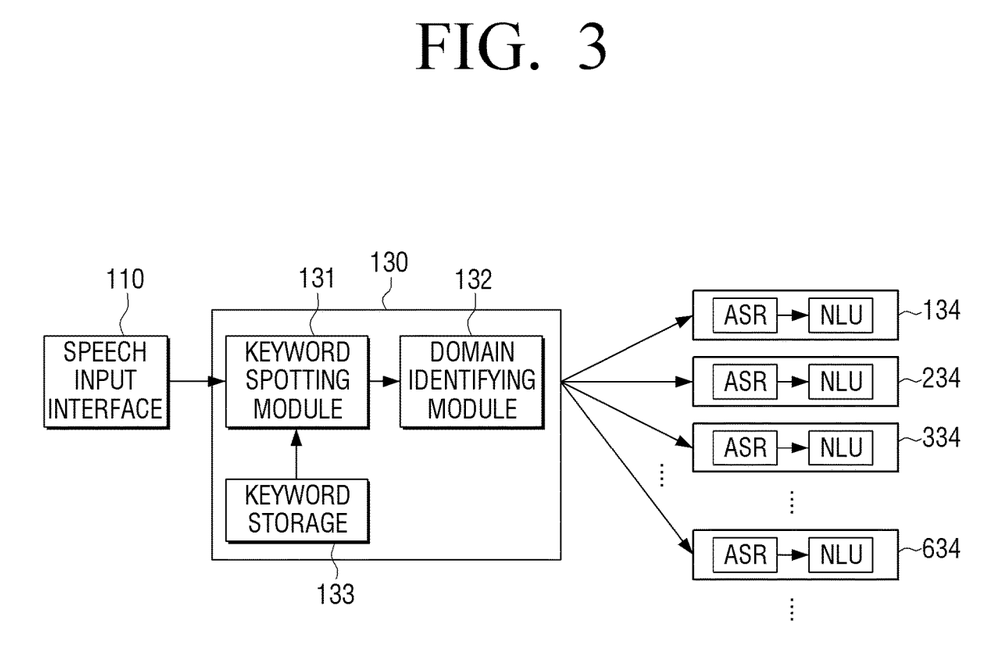
FIG. 3 is a diagram illustrating an example process of identifying an electronic device corresponding to a user's speech according to an embodiment of the disclosure.

FIG. 3 is a diagram illustrating an example process of identifying an electronic device corresponding to a user's speech according to an embodiment of the disclosure.

The processor 140 may control the speech input interface 110 so that the user's speech may be converted into a speech signal. The user's speech input to the speech input interface 110 may be converted into the speech signal through the microphone (not illustrated), the ADC (not illustrated), the energy determiner (not illustrated), the noise remover (not illustrated), and the speech signal generator (not illustrated).

When the user's speech is converted into the speech signal, the processor 140 may use a keyword spotting module (e.g., including processing circuitry and/or executable program elements) 131 and a domain identifying module (e.g., including processing circuitry and/or executable program elements) 132 stored in the storage 130 in order to identify a domain for the user's speech.

The processor 140 may obtain a keyword included in the speech signal using the keyword spotting module 131 stored in the storage 130.

For example, the processor 140 may convert the user's speech signal into a text form using the keyword spotting module 131. To this end, an ASR engine performing an STT function may be included in the keyword spotting module 131. This is only an example, and the keyword spotting module 131 may also transmit the user's speech signal to an ASR engine of a speech recognition engine 134 and receive a speech recognition result converted into a text from the ASR engine of the speech recognition engine 134.

The processor 140 may control the keyword spotting module 131 to spot keywords from the text corresponding to the user's speech using keyword data for each domain stored in the storage 130. This will be described in greater detail below with reference to FIG. 4.

Keywords for each domain may also be stored in a separate server (not illustrated) rather than the storage 130. In this example, the electronic device 100 may receive keyword information for each domain from the server (not illustrated), and spot the keywords from a text corresponding to the user's speech using the keyword spotting module 131 and the domain identifying module 132.

The keyword data for each domain used to spot the keyword of the user's speech may be set at the time of manufacturing the electronic devices 100, 200, 300, 400, 500, 600 and 700. However, the keyword data for each domain is not necessarily limited thereto, and may also be additionally updated by the user.

The processor 140 may select the keyword and at the same time, identify a domain in which the keyword is included.

As described above, the processor 140 may spot the keywords for each word included in the text converted from the user's speech, and identify the domains for each keyword.

The processor 140 may control the domain identifying module 132 to identify the domain for the user's speech using the domain information for each of the keywords included in the text.

A method of identifying a domain will be described in greater detail below with reference to FIGS. 4, 5A and 5B.

When the domain for the user's speech is identified, the processor 140 may transmit the user's speech signal to a speech recognition engine based on the corresponding domain. In this example, the speech recognition engine may be the speech recognition engine 134 corresponding to the electronic device 100 receiving the user's speech or be speech recognition engines 234, 334, . . . and 634 corresponding, respectively, to the external electronic devices 200, 300, 400, 500, 600 and 700.

In another example embodiment of the disclosure, the keyword spotting module 131, the domain identifying module 132, and a keyword storage 133 of FIG. 3 may be stored in a separate server (not illustrated).

In this example, the electronic device 100 may transmit the speech signal received from the user to the server (not illustrated), and the server (not illustrated) may spot the keyword from a text corresponding to the user's speech signal using the keyword spotting module, the domain identifying module, and the keyword storage stored in the server (not illustrated) and identify the domain for the user's speech.

In this example, the server may transfer a speech recognition result to the electronic device 100, and the electronic device 100 receiving the speech recognition result may transfer the user's speech signal to the speech recognition engine of the external electronic device corresponding to the identified domain. The server may directly transfer the user's speech signal to the speech recognition engine of the external electronic device corresponding to the identified domain.

The speech recognition engine receiving the user's speech signal may perform the speech recognition for the user's speech signal.

For example, the speech recognition engine may convert the user's speech signal into text data using an ASR engine, and perform, for example, and without limitation, morphological analysis, syntax analysis, and semantic analysis, and the like, on the user's speech converted into the text data using an NLU engine.

As a result, the speech recognition engines 134, 234, 334, . . . and 634 may transmit a speech recognition result for the user's speech to the electronic devices 100, 200, 300, 400, 500, 600 and 700 corresponding to the speech recognition engines, and the electronic devices 100, 200, 300, 400, 500,

600 and 700 receiving the speech recognition result may perform functions depending on the speech recognition result.

In another example embodiment of the disclosure, the electronic devices 100, 200, 300, 400, 500, 600 and 700 receiving the speech recognition result may transmit a response signal depending on the speech recognition result such as a response signal indicating that the electronic devices 100, 200, 300, 400, 500, 600 and 700 have received the speech recognition result, a signal indicating that the electronic devices 100, 200, 300, 400, 500, 600 and 700 have performed the functions depending on the speech recognition result, or the like, to the electronic device 100 to which the user inputs his/her speech, depending on the speech recognition result.

Figure 4:
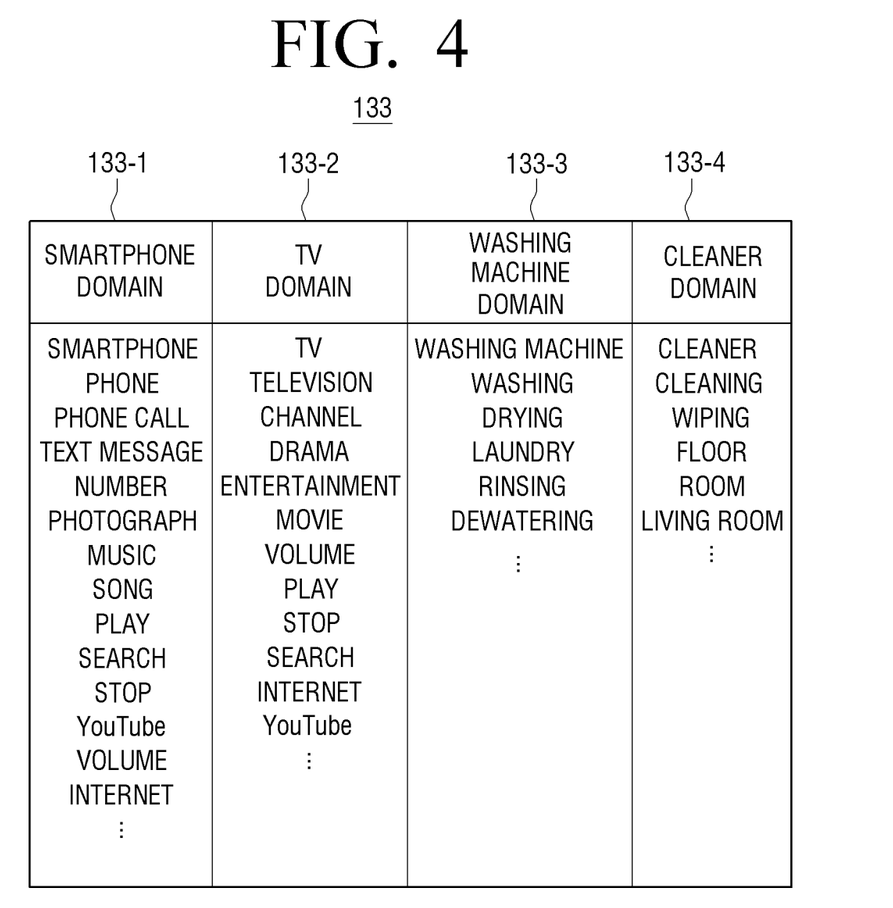
FIG. 4 is a diagram illustrating an example keyword storage and an example keyword obtaining method according to an embodiment of the disclosure.
Figure 5A:
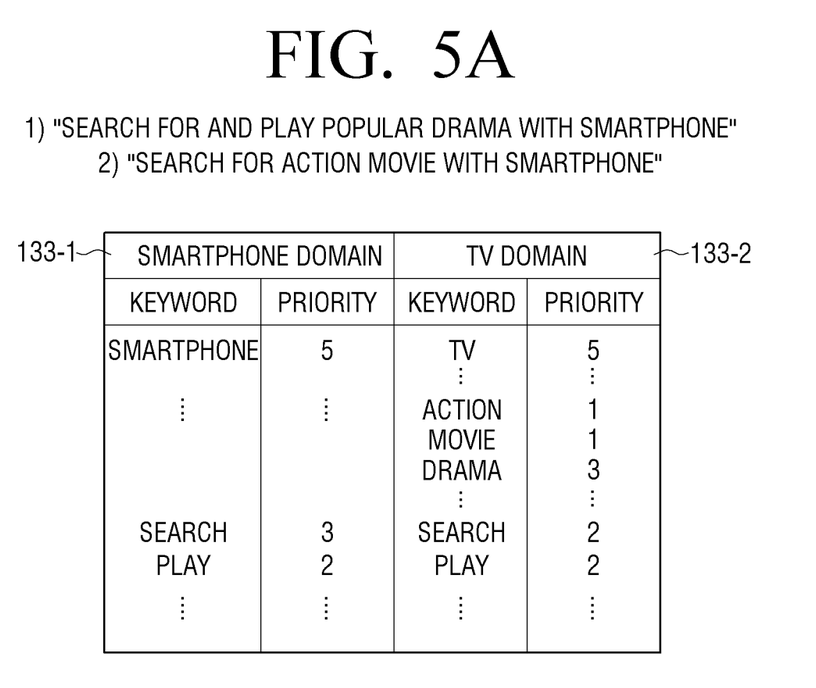
FIGS. 5A and 5B are diagrams illustrating an example method of identifying a domain according to an embodiment of the disclosure.
Figure 5B:
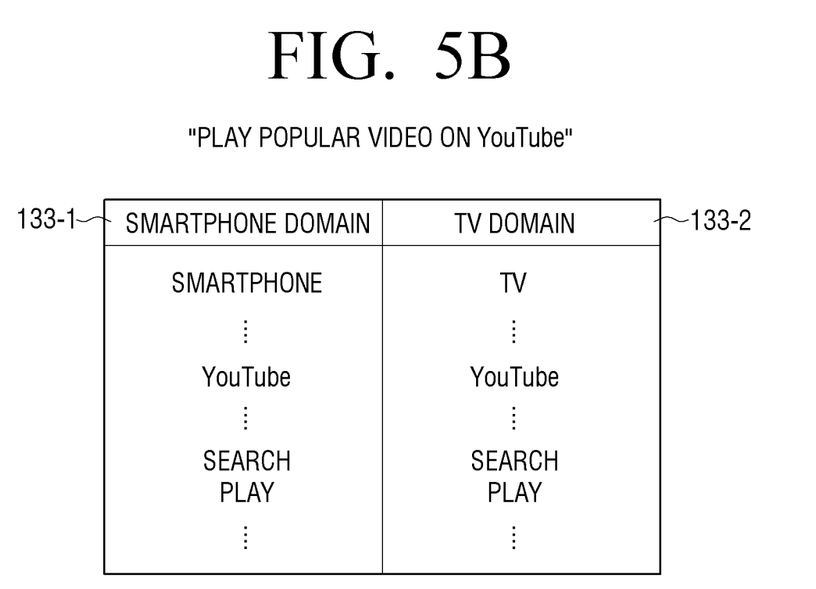

FIGS. 4, 5A and 5B are diagrams illustrating an example method of identifying a domain for a user's speech according to an embodiment of the disclosure.

In this regard, a keyword storage 133 in which keyword data for each of the domains are stored is illustrated in FIG. 4. As described above, the keyword may be a word often used or likely to be used in a specific domain. Domains and keywords illustrated in FIG. 4 are only examples of the disclosure, and domains and keywords stored in the keyword storage 133 are not necessarily limited thereto.

The processor 140 may obtain a word coinciding with at least one keyword for each of a plurality of domains as a keyword in the user's speech.

For example, the processor 140 may sequentially select keywords in the keyword data for each domain stored in the keyword storage 133, and search whether or not the same word as the corresponding keyword is present in the text converted from the user's speech. When the same word as the keyword is present in the text, the processor 140 may select the corresponding word as the keyword.

For example, in the keyword data stored in FIG. 4, the processor 140 may sequentially select keywords such as a 'smartphone', a 'phone', . . . , a 'washing machine', . . . , 'drying', . . . , 'laundry', . . . , a 'cleaner', and the like, in the keyword information for each domain stored in the keyword storage, and determine whether or not the selected keywords are included in the user's speech.

As another embodiment, the processor 140 may divide the user's speech converted into the text data in a morphological unit, and identify whether or not a morpheme included in the text data is included in the keyword storage 133.

To this end, the keyword spotting module may include an NLU engine performing a function of dividing a text sentence into a morphological unit. The processor 140 may divide the text data into the morphological unit using the NLU engine stored in the speech recognition engine 134.

When one word of a plurality of morphemes included in the text data is included in the keyword storage 133, the processor 140 may obtain the corresponding word as the keyword.

For example, when the user's speech is "Where is the robot cleaner?", the processor 140 may divide the user's speech into 'where', 'is', 'robot', and 'cleaner', and identify whether the respective words are included in the keyword storage 133. In this case, the word 'cleaner' is included in the keyword storage 133, and the 'cleaner' included in the user's speech becomes the keyword.

The processor 140 may spot the keyword and at the same time, identify a domain for the obtained keyword. In the example described above, the processor 140 may identify that a domain for the keyword 'cleaner' is a 'cleaner domain'.

When the number of keywords obtained from the text data is plural, the processor 140 may identify domains for the respective keywords.

In addition, the processor 140 may determine that a domain most identified among a plurality of domains for the plurality of keywords is a domain for the user's speech.

For example, the processor 140 may identify a domain related to the obtained keywords based on a comparison between the obtained keywords and the keywords stored in the storage.

For example, the processor 140 may determine the numbers of keywords matched to the keywords for each domain stored in the keyword storage 133 among the obtained keywords for each domain to identify the domain related to the obtained keywords.

For example, the processor 140 may identify that a domain in which the number of keywords matched to the obtained keywords is the largest among the plurality of domains is the domain related to the obtained keywords.

For example, when the user's speech is "Where is the robot cleaner?", the 'cleaner' becomes the keyword, as described above, and the processor 140 identifies keywords matched to the 'cleaner' for each domain.

In this example, because one keyword matched to the keyword 'cleaner' is present in the cleaner domain, but a keyword matched to the keyword 'cleaner' is not present in a TV domain, a smartphone domain, and a washing machine domain, the cleaner domain becomes a domain corresponding to the obtained keyword.

As another example, a case in which a plurality of keywords are obtained from the user's speech will be described. For example, when the user's speech is "Play a movie on the TV'", the processor 140 may divide the user's speech into 'play', 'movie', and 'TV', and identify whether the respective words are included in the keyword storage 133. Because the words 'play', 'movie', and 'TV' are included in the keyword storage 133, all of the words 'play', 'movie', and 'TV' may become keywords.

In this example, the processor 140 may identify a level in which keywords matched to 'play', 'movie', and 'TV' are present for each domain. The processor 140 may identify that all the three keywords 'play', 'movie', and 'TV' are matched in the TV domain, a keyword 'play' is matched in the smartphone domain, and keywords are not present in the washing machine domain and the cleaner domain.

In addition, the processor 140 may identify that the TV domain in which the number of keywords matched to the keywords obtained from the user's speech is the largest is the domain related to the obtained keywords.

The processor 140 may identify the domain related to the obtained keywords based on priorities of the keywords as well as the numbers of keywords matched to the keywords for each domain stored in the keyword storage 133 among the obtained keywords.

FIGS. 5A and 5B are diagrams illustrating an example method of identifying domains corresponding to obtained keywords based on priorities.

In this regard, as illustrated in FIG. 5A, priorities for keywords for each domain as well as the keywords may be stored in the keyword storage 133. In this example, even though keywords are the same as each other, priorities of the keywords may be determined to be different from each other depending on domains.

For example, a keyword 'search' is a word frequently used in the smartphone and the TV, and may thus be included the smartphone domain and the TV domain. However, in a case in which it is assumed that the keyword 'search' is more frequently used in the smartphone than in the TV, when the user utters a word 'search', it is likely that the user will utter the word 'search' in order to control the smartphone. Therefore, a priority of the word 'search' included in the smartphone domain may be set to be higher than that of the word 'search' included in the TV domain.

The processor 140 may identify the domain related to the obtained keywords based on at least one of the level in which the keywords matched to the obtained keywords are present and the priorities set for each domain.

For example, when the number of domains in which the numbers of keywords matched to the obtained keywords are the largest among the plurality of domains is plural, the processor 140 may identify that a domain having the highest priority is the domain related to the obtained keywords depending on priorities set for the plurality of domains in which the numbers of keywords are the largest.

For example, when the user utters "Search for and play popular drama with smartphone" to the electronic device 100 as illustrated in 1) of FIG. 5A, the processor 140 may obtain 'search for', 'play', 'drama', and 'smartphone' matched to words stored in the keyword storage 133 as keywords from the user's speech.

In this example, the keywords 'search for', 'play', and 'smartphone' of the keywords obtained from the user's speech are included in the smartphone domain 133-1, the keywords 'search for', 'play', and 'drama' are included in the TV domain 133-2, and keywords included in the washing machine domain 133-3 and the cleaner domain 133-4 are not present (as illustrated in FIG. 4).

For example, the processor 140 may identify that the TV domain 133-2 and the smartphone domain 133-1 are the domains in which the numbers of keywords matched to the keywords ('search for', 'play', 'drama', and 'smartphone') obtained from the user's speech are the largest among the plurality of domains of the keyword storage 133.

In this example, the processor 140 may identify that a domain having the highest priority is the domain related to the obtained keywords ('search for', 'play', 'drama', and 'smartphone') depending on priorities set for the TV domain 133-2 and the smartphone domain 133-1.

In this regard, referring to portions of the keyword storage 133 illustrated in FIG. 5A, a priority of the TV domain 133-2 is 7 (drama (3), search for (2), and play (2)), while a priority of the smartphone domain 133-1 is 10 (smartphone (5), search for (3), and play (2)).

For example, the priority of the smartphone domain 133-1 is higher than that of the TV domain 133-2, and the processor 140 may thus identify that the smartphone domain 133-1 is the domain corresponding to the obtained keywords. It is, thus, likely that the speech uttered by the user will be recognized in a speech recognition engine based on the smartphone domain.

The processor 140 may also identify the domain related to the obtained keywords in consideration of only the priorities regardless of the number of keywords matched to the obtained keywords.

For example, when the user utters "Search for action movie with smartphone" to the electronic device 100 as illustrated in 2) of FIG. 5A, the processor 140 may obtain 'search for', 'action', 'movie', and 'smartphone' matched to words stored in the keyword storage 133 as keywords from the user's speech.

In this case, the keywords 'search for' and 'smartphone' of the keywords obtained from the user's speech are included in the smartphone domain 133-1, the keywords 'search for', 'action', and 'movie' are included in the TV domain 133-2, and keywords included in the washing machine domain 133-3 and the cleaner domain 133-4 are not present.

In addition, a priority of the smartphone domain 133-1 is 8 (smartphone (5) and search for (3)), while a priority of the TV domain 133-2 is 4 (action (1), movie (1), and search for (2)).

For example, the number of keywords matched to the obtained keywords is less in the smartphone domain 133-1 than in the TV domain, but the smartphone domain 133-1 has a higher priority than that of the TV domain. Therefore, the processor 140 may identify that the smartphone domain 133-1 is the domain corresponding to the obtained keywords.

The priorities may be determined based on the electronic device to which the user's speech is input.

For example, when the number of domains in which the numbers of keywords matched to the obtained keywords are the largest is plural, the processor 140 may identify that a domain corresponding to the electronic device to which the user's speech is input is the domain related to the obtained keywords.

For example, when the user utters "Play a popular video on YouTube" using the smartphone, as illustrated in FIG. 5B, the processor 140 may obtain 'play' and 'YouTube' as keywords using the keyword storage 133. In this example, 'play' and 'YouTube' are included in both of the smartphone domain 133-1 and the TV domain 133-2, and are not included in the washing machine domain 133-3 and the cleaner domain 133-4 (see, e.g., FIG. 4). The processor 140 may identify that the smartphone domain 133-1 corresponding to the smartphone to which the user's speech is input is the domain related to the obtained keywords.

The domains for the user's speech are identified in consideration of the priorities for each domain, but when the priorities for each domain are the same as each other, the processor 140 may identify that the domain corresponding to the electronic device to which the user's speech is input is the domain related to the obtained keywords.

As another example embodiment, when the number of domains in which the numbers of keywords matched to the keywords obtained from the user's speech are the largest is plural or the number of domains matched to the obtained keywords and having a high priority is plural, the processor 140 may request the user to select the domains.

In this example, the processor 140 may display a message for requesting the electronic device 100 to which the user inputs his/her speech to select the electronic devices 100, 200, 300, 400, 500, 600 and 700 to which the user's speech signal is to be transferred, a list of a plurality of electronic devices 100, 200, 300, 400, 500, 600 and 700, and the like.

For example, it is assumed that the user utters "raise a volume of YouTube" using the TV, keywords 'volume' and 'YouTube' are included in the TV domain 133-2 and the smartphone domain 133-1, and priorities of the TV domain 133-2 and the smartphone domain 133-1 are the same as each other. In this case, the TV receiving the user's speech from the user does not select the domain for user's speech, and may display a message indicating that the user may select the electronic device, to which the user's speech is to be transferred, of the TV and the smartphone, on a display of the TV.

When the electronic device 100 receiving the user's speech does not include a display such as a set-top box, the electronic device 100 may transmit a message signal to an external display device (not illustrated) using wired and wireless interfaces. The external display device (not illustrated) receiving the message signal may display a message for requesting the electronic device 100 to select the electronic devices 100, 200, 300, 400, 500, 600 and 700 to which the user's speech signal is to be transferred, a list of a plurality of electronic devices 100, 200, 300, 400, 500, 600 and 700, and the like.

The electronic device 100 receiving the user's speech from the user may identify the domain corresponding to the user's speech using the keyword spotting module 131 and the domain identifying module 132 and at the same time, perform the speech recognition using the speech recognition engine 134 of the electronic device 100.

Figure 6:
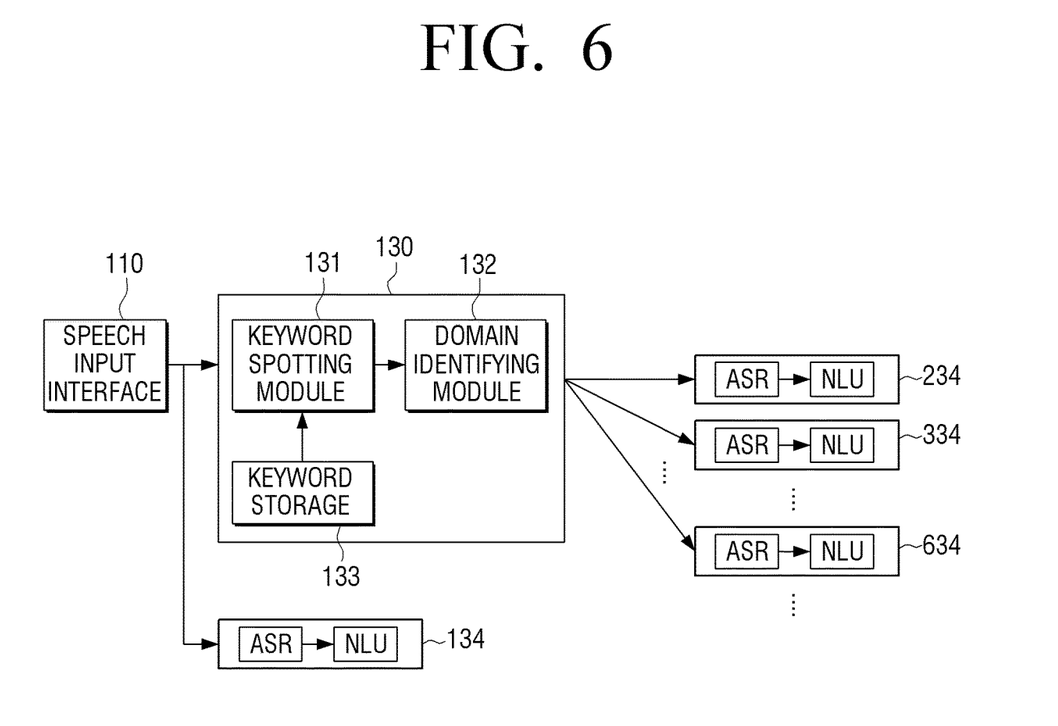
FIG. 6 is a diagram illustrating an example process of identifying a domain corresponding to a user's speech according to another embodiment of the disclosure.

FIG. 6 is a diagram illustrating an example process of identifying a domain corresponding to a user's speech according to another embodiment of the disclosure.

When the user's speech is input, the processor 140 of the electronic device 100 may spot the keywords from the user's speech, identify the domain corresponding to the user's speech, and at the same time, perform the speech recognition using the speech recognition engine 134 based on the domain corresponding to the electronic device 100.

The processor 140 may determine whether to use a result of the speech recognition performed in the speech recognition engine 134 of the electronic device 100 based on whether or not the identified domain and the domain corresponding to the electronic device 100 coincide with each other.

For example, the processor 140 may process a process of spotting the keywords from the user's speech and identifying the domain and a process of accessing the speech recognition engine 134 of the electronic device 100 in parallel.

When the identified domain and the domain corresponding to the electronic device 100 do not coincide with each other, the processor 140 may transmit the user's speech to the external electronic devices 200 to 700 corresponding to the identified domain through the communicator 130.

On the other hand, when the identified domain and the domain corresponding to the electronic device 100 coincide with each other, the processor 140 may use a result of the speech recognition performed in the speech recognition engine corresponding to the electronic device 100. In this example, the electronic device 100 may directly output the result of the speech recognition performed in the speech recognition engine 134, and a response time to the user speech may thus be reduced.

Figure 7:
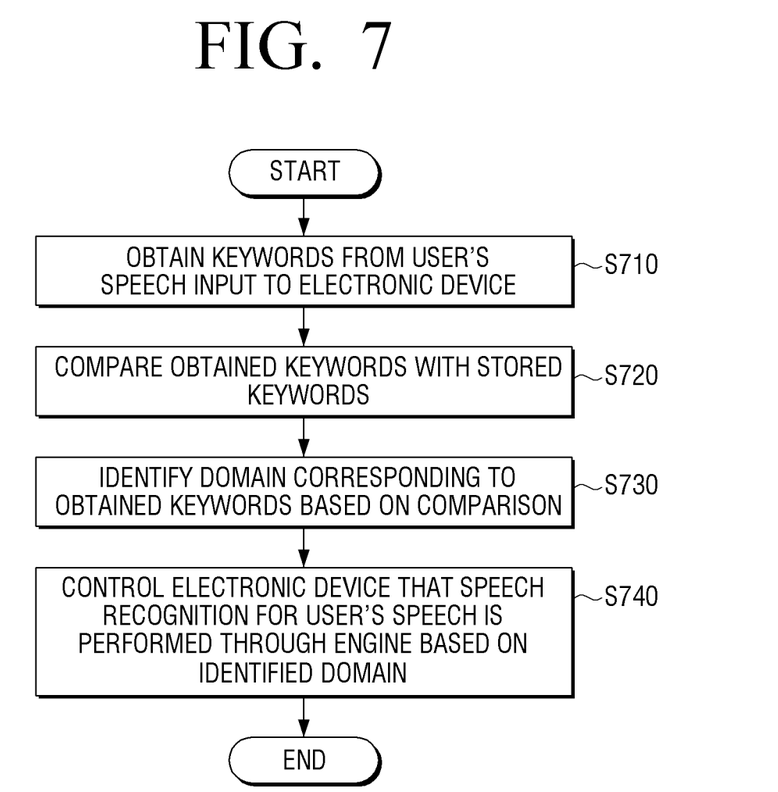
FIG. 7 is a flowchart illustrating an example method of determining an electronic device receiving a speech signal by an electronic device according to an embodiment of the disclosure.

FIG. 7 is a flowchart illustrating an example method of determining a domain of an electronic device according to an embodiment of the disclosure.

The keywords are obtained from the user's speech input to the electronic device (S710).

In this example, in the obtaining of the keywords, words matched to at least one keyword for each of the plurality of domains may be obtained as the keywords from the user's speech.

The obtained keywords are compared with the keywords stored in the electronic device (S720).

The domain corresponding to the obtained keywords is identified based on a comparison result (S730).

For example, the identifying of the domain may include identifying that the domain in which the number of keywords matched to the obtained keywords is the largest among the plurality of domains is the domain related to the obtained keywords.

In addition, in the identifying of the domain, the domain related to the obtained keywords may be identified based on at least one of the level in which the keywords matched to the obtained keywords are present and the priorities set for each domain.

In this example, in the identifying of the domain, when the number of domains in which the numbers of keywords matched to the obtained keywords are the largest among the plurality of domains is plural, it may be identified that a domain having the highest priority is the domain related to the obtained keywords depending on the priorities set for the plurality of domains in which the numbers of keywords are the largest.

For example, the priorities may be determined based on the electronic device to which the user's speech is input.

The electronic device is controlled such that the speech recognition for the user's speech is performed through the engine based on the identified domain (S740).

The various example embodiments described above may be implemented in a computer or a computer-readable recording medium using software, hardware, or a combination of software and hardware. According to a hardware implementation, embodiments described in the disclosure may be implemented using, for example, and without limitation, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, embodiments described in the disclosure may be implemented by the processor 140 itself. According to a software implementation, embodiments such as procedures and functions described in the disclosure may be implemented by separate software modules. Each of the software modules may perform one or more functions and operations described in the disclosure.

Computer instructions for performing processing operations of the electronic devices according to the various example embodiments of the disclosure described above may be stored in a non-transitory computer-readable medium. The computer instructions stored in the non-transitory computer-readable medium allow a specific apparatus to perform the processing operations of the electronic devices according to the various example embodiments described above when they are executed by a processor of the specific apparatus.

The non-transitory computer-readable medium may refer, for example, to a medium that semi-permanently stores data and is readable by the apparatus. Non-limiting examples of the non-transitory computer-readable medium may include a compact disk (CD), a digital versatile disk (DVD), a hard disk, a Blu-ray disk, a universal serial bus (USB), a memory card, a read only memory (ROM), or the like.

Although various example embodiments of the disclosure have been illustrated and described above, the disclosure is not limited to the abovementioned embodiments, but may be variously modified by those skilled in the art to which the disclosure pertains without departing from the spirit of the disclosure as disclosed, for example, in the accompanying claims. These modifications should also be understood to fall within the scope and spirit of the disclosure.

What is claimed is:

1. An electronic device comprising:
 a voice input receiver configured to receive a user voice input;
 a communicator comprising communication circuitry;
 a storage configured to store at least one keyword for each of a plurality of domains; and a processor configured to:
> based on the user voice input being received, obtain keywords from the user voice input received by the voice input receiver,
> identify a domain related to the obtained keywords based on the obtained keywords and keywords stored in the storage,
> perform voice recognition via an engine of the electronic device based on a domain corresponding to the electronic device,
> identify whether to use a result of the voice recognition based on whether the identified domain corresponds to the domain corresponding to the electronic device,
> control the electronic device to transmit, via the communicator, the user voice input to an engine of an external electronic device corresponding to the identified domain based on at least the identified domain not corresponding to the domain corresponding to the electronic device.

2. The electronic device as claimed in claim 1, wherein the processor is configured to control the electronic device to obtain words matched to the at least one keyword for each of the plurality of domains as the keywords from the user voice input.

3. The electronic device as claimed in claim 1, wherein the processor is configured to identify that the domain related to the obtained keywords is a domain in which a number of keywords matched to the obtained keywords is the largest among the plurality of domains.

4. The electronic device as claimed in claim 1, wherein the processor is configured to identify the domain related to the obtained keywords based on at least one of: a level in which keywords matched to the obtained keywords are present and priorities set for each domain of the plurality of domains.

5. The electronic device as claimed in claim 4, wherein based on plural domains of the plurality of domains being identified to have a largest number of keywords matched to the obtained keywords, the processor is configured to identify that a domain having a highest priority of the plural domains is the domain related to the obtained keywords.

6. The electronic device as claimed in claim 5, wherein the priorities are determined based on an electronic device to which the user voice input is received.

7. The electronic device as claimed in claim 1, wherein the user voice input is transmitted to the engine of the external electronic device based on the identified domain corresponding to the external electronic device.

8. The electronic device as claimed in claim 7, wherein the external electronic device is configured to perform voice recognition using an engine of a specific domain of the plurality of domains.

9. The electronic device as claimed in claim 1, wherein the processor is configured to use the result of the performed voice recognition based on the identified domain corresponding to the domain corresponding to the electronic device.

10. A method of controlling an electronic device, comprising:
> based on a user voice input being received, obtaining keywords from a user voice input to a voice input receiver of the electronic device;
> identifying a domain related to the obtained keywords based on the obtained keywords and the keywords stored in the electronic device;
> performing voice recognition using an engine of the electronic device based on a domain corresponding to the electronic device;
> identifying whether to use a result of the voice recognition based on whether the identified domain corresponds to the domain corresponding to the electronic device; and
> transmitting the user voice input to an engine of an external electronic device corresponding to the identified domain based on at least the identified domain not corresponding to the domain corresponding to the electronic device.

11. The method of controlling an electronic device as claimed in claim 10, wherein in the obtaining of the keywords, words matched to at least one keyword for each of a plurality of domains are obtained as the keywords from the user voice input.

12. The method of controlling an electronic device as claimed in claim 10, wherein the domain related to the obtained keywords is a domain in which a number of keywords matched to the obtained keywords is the largest among a plurality of domains.

13. The method of controlling an electronic device as claimed in claim 10, wherein in the identifying of the domain, the domain related to the obtained keywords is identified based on at least one of: a level in which keywords matched to the obtained keywords are present and priorities set for each domain of a plurality of domains.

14. The method of controlling an electronic device as claimed in claim 13, wherein in the identifying of the domain, based on plural domains of the plurality of domains being identified to have a largest number of keywords matched to the obtained keywords, a domain having a highest priority of the plural domains is the domain identified as being related to the obtained keywords.

15. The method of controlling an electronic device as claimed in claim 14, wherein the priorities are determined based on an electronic device to which the user voice input is received.

16. The method of controlling an electronic device as claimed in claim 10, wherein the user voice input is transmitted to the engine of the external electronic device based on the identified domain corresponding to the external electronic device.

17. The method of controlling an electronic device as claimed in claim 16, wherein the external electronic device performs the voice recognition using an engine of a specific domain of a plurality of domains.

18. The method of controlling an electronic device as claimed in claim 10, wherein the performing the voice recognition for the user voice input further includes using the result of the performed voice recognition based on the identified domain corresponding to the domain corresponding to the electronic device.

* * * * *